April 20, 1971  J. M. MORRIS ET AL  3,575,840
ANODE CLAMPING SYSTEM AND ANODE CLAMPS
Filed Aug. 19, 1968  4 Sheets-Sheet 1

INVENTORS
JOEL M. MORRIS
JACOB BRAYMAN
BY Auslander + Thomas
ATTORNEYS

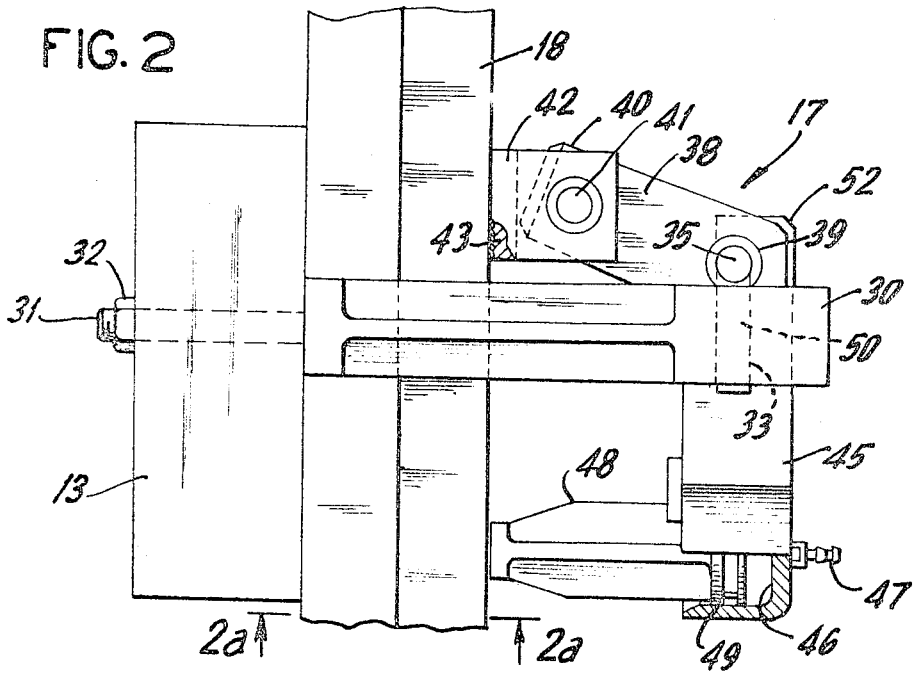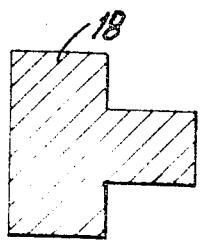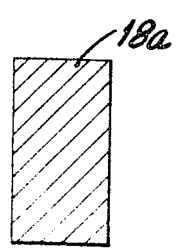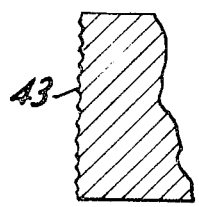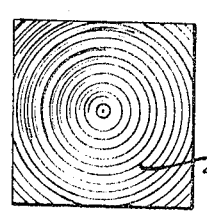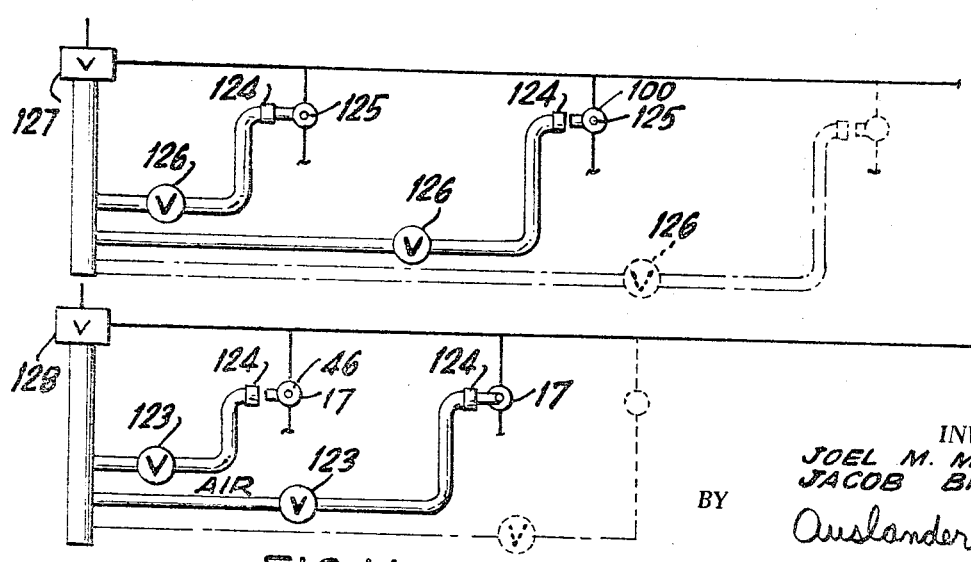

INVENTORS
JOEL M. MORRIS
JACOB BRAYMAN
BY Auslander + Thomas
ATTORNEYS

United States Patent Office 3,575,840
Patented Apr. 20, 1971

3,575,840
ANODE CLAMPING SYSTEM AND
ANODE CLAMPS
Joel M. Morris, East Norwalk, Conn., and Jacob Brayman, Staten Island, N.Y., assignors to Metallurgical Consultants, Inc., New York, N.Y.
Filed Aug. 19, 1968, Ser. No. 753,361
Int. Cl. C23b 5/70
U.S. Cl. 204—297
32 Claims

ABSTRACT OF THE DISCLOSURE

An anode rod clamping system in which quickly actuatable clamps and a fail-safe mechanism provide better clamping grasp of anode rods and quicker, firmer adjustability or replacement of ganged or individual anodes, primarily for use in aluminum reduction. The major clamp is adapted for an adjustable bus bar with a secondary clamp on a stationary bar, to hold anode rods while the first clamp is released or adjusted. The system also provides better electrical contact of the anodes from the bus bar through the anode rods to the actual anode.

---

The present invention relates to an anode rod clamping system and anode rod clamps primarily as used in the production of primary aluminum.

One method for the production of aluminum employs electrolytic reduction of aluminum oxide in a cell usually with a multiplicity of carbon anodes attached to vertical anode rods. In this method continuous electrical contact is maintained between the anode rods and a movable horizontal anode bus, even during relative adjustment in height of either anodes or the anode bus bar.

In the past an aluminum reduction pot was used to convert the aluminum oxide to pure aluminum by reduction in an electrolytic fusion. The alumina was reduced by the application of large electrical currents through a number of anodes which were usually prebaked. The anodes had to draw current relatively evenly in order for the process to function efficiently.

In such system of electrolytic aluminum reduction the anode electrode assembly consisted of a vertical rod to which anode carbon blocks (one or more) were attached. A crane lifted the anode rod assembly into a position where the vertical anode rod would bear against the horizontal bus and the anode was set when the crane lowered the assembly to the desired height. Each rod was suspended by a clamp from a horizontal anode bus bar carrying DC electric current. The anode bus bar was movable vertically upward or downward to regulate voltage in the cell as anodes were consumed. This consumption was at the rate of one inch, more or less each day.

It was general practice to clamp the anode bus and the anode rod by some pressure means, which could be easily released, such as a clamping device, to mechanically and electrically attach the anode rod to the anode bus. This was necessary because the anode assembly was periodically replaced. In the operation of the electrolytic cell it was necessary to get a new purchase or grip on the rod when the movable bus reached its lowest position and needed to be raised again while the cell is in operation.

As the art of aluminum production advanced, larger cells and larger anodes have been used with greater current consumption, thus accentuating the need for greater clamping pressures to secure the best possible electrical contact and mechanical support under all conditions. Prior clamping systems were limited due to the fact that they employed hand-turned screws actuatable with or without wrenches. With the physical limitations of space a final pressure as great as desired was not always obtainable.

Clamps of the past generally were not provided with a fail safe mechanism. When a tightening device became disengaged for any reason, the anode often slipped and touched the cathode causing an electrical short and subsequent damage to equipment.

The electrical contact quality of clamps of the past often deteriorated and the efficiency of the electrolytic process decreased. Improper electrical contact often caused arcing and sparking which oxidized the contact surfaces. Such faults of the clamps often caused uneven distribution of electrical current between the various anodes in the same electrolytic cell.

Another problem of the prior clamping or holding systems was the human element involved in proper fastening or tightening at said clamps. The operators on occasion failed to properly tighten and adjust the holding clamps correctly, causing a loss of efficiency through uneven and improper electrical contact and resultant arcing.

As the bottom faces of the anodes were burned up at a rate of about 1″ a day the anodes had to be lowered periodically into the bath in the cell in order to maintain constant cell voltage and efficient operation. The metal accumulating on the bottom of the cell compensated for most of the burning off of the anodes; but when the cell was tapped every day or two, the anodes had to be lowered to maintain relatively constant voltage.

Usually all anodes were lowered together by lowering the anode bus to which the anodes are clamped. Every week or two the anode bus reached its extremity of travel downward. Then the anode bus had to be raised to take a new hold on the rods.

In order to raise the anode bus into a new position the main clamps supporting the anode rods against the movable bus had to be released. To do this the upper clamps mounted on the fixed superstructure above the main clamps were first all tightened in order to support the weight of each anode assembly from the fixed superstructure to prevent sliding of the anodes into the cell bath.

Since all anodes in the same cell bath were consumed they had to be replaced periodically. This replacement was best performed quickly so that constant electrical contact should be maintained between the anode rods and the bus bar. Clamps of the past were slow and uncertain in their grasp, causing waste of labor and time and always held the threat of allowing an anode to slip into the bath.

According to the present invention an anode rod clamping system is provided including quickly actuatable clamps and a fail safe mechanism which provides better clamping grasp of the anode rods and quicker firmer adjustability or replacement of ganged or individual anodes in the production of aluminum.

Although such novel feature or features believed to be characteristic of the invention are pointed out in the claims, the invention and the manner in which it may be carried out may be further understood by reference to the description following and the accompanying drawings.

FIG. 2 is a side elevation of an anode clamp of the present invention.

FIG. 2a is a section of the anode rod of FIG. 2 at lines 2a—2a.

FIG. 2b is a section of another optional anode rod shape.

FIG. 2c is a detail of the clamping shoe of FIG. 2.

FIG. 2d is a variant detail of FIG. 2c.

FIG. 11 is a schematic of a pressure control system to the upper and lower anode clamps.

Referring now to the figures in greater detail, where like reference numbers denote like parts in the various figures.

Figure 1:
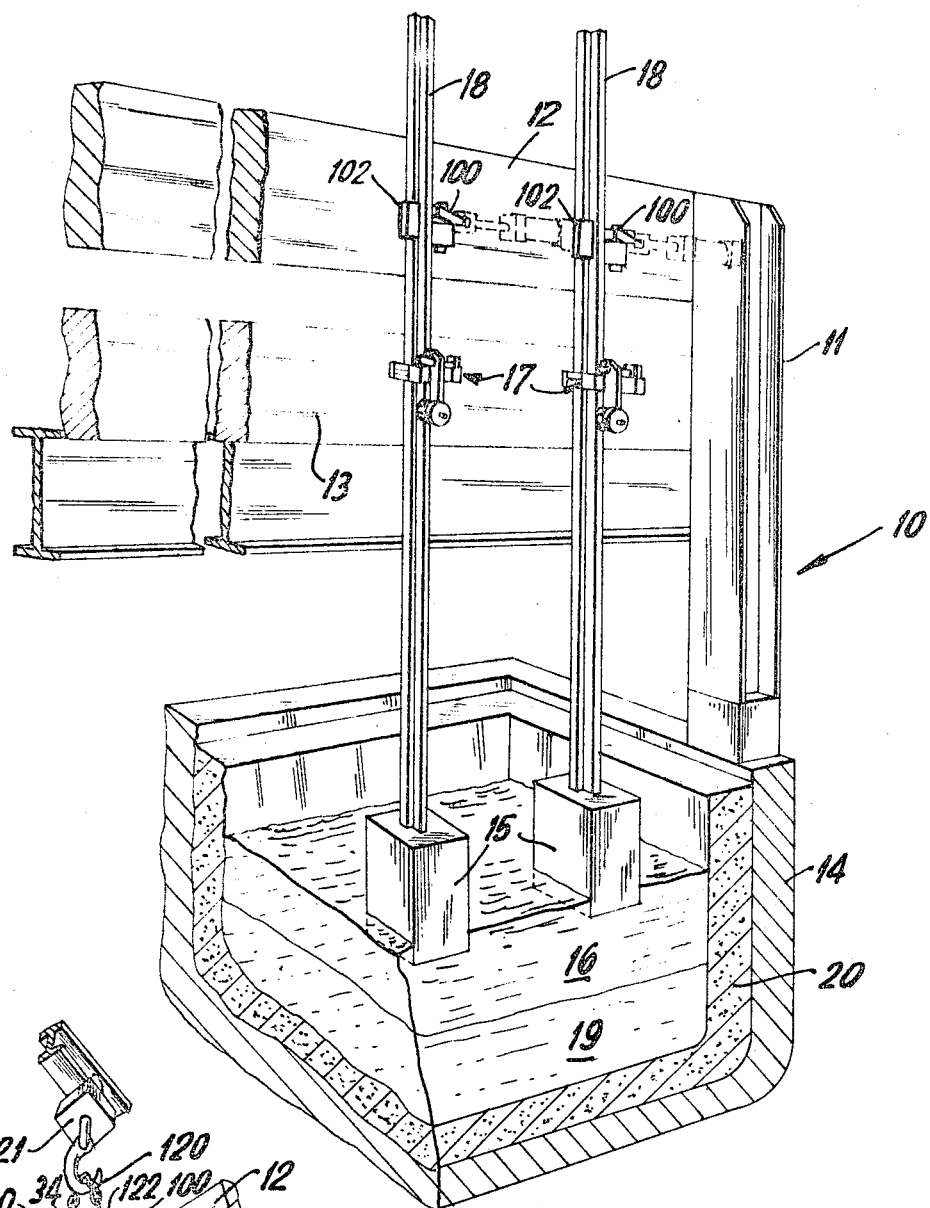
FIG. 1 is a cut away view of a reduction cell including the means of the present invention.

As shown in FIG. 1 an aluminum reduction cell 10 is provided with an upright support 11, a stationary bar 12, rigidly fixed to the upright support 11, an adjustable bus bar 13 and a pot 14. Anodes 15 are suspended in the bath 16 by being held in the lower anode rod clamps 17 which grasp the anode rods 18, 18a. The full assembly of the anode 15, electrode, usually includes a carbon block and anode rods 18, 18a in one assembly, anode rods 18, 18a are attached to the carbon block or the assembly of the anodes 15 so that current can pass through the bus bar 13 to the anode 15 in circuit with the bath 16 and any metal in the pot 14 and the cathode lining 20 of the pot 14.

Figure 3:
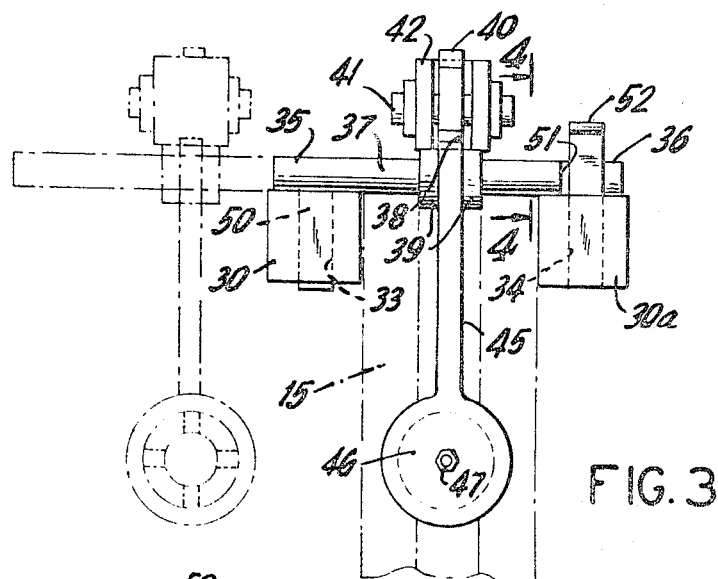
FIG. 3 is a front elevation of the bus bar clamp of FIG. 2.
Figure 4:
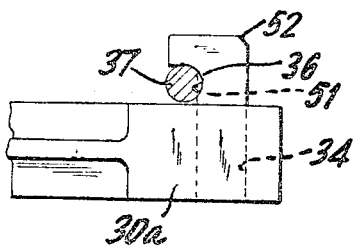
FIG. 4 is a section of FIG. 3 at lines 4—4.

As shown in FIGS. 2 and 3 a lower anode clamp 17 comprises support bars 30 mounted on the bus bar 13. As illustrated in FIG. 2 the support bars 30, 30a which form arms have integral extensions 31 which may be threaded to receive nuts 32 as a means to hold the support bars 30 firmly engaged on the bus bar 13 through an opening therethrough. The anode rod 18, 18a is backed and supported by the bus bar 13 once mounted and clamped. On both of the anode support bars 30, 30a are openings 33, 34, (see FIG. 10) into which the ends 35, 36 of the trunnion 37 are held. The trunnion 37 is operably affixed on the support bars 30, 30a. A clamp lever 38 is positioned on the trunnion 37 and is freely rotatable about it held in place by stops 39. The trunnion 37 serves as a fulcrum for the lever means 38. The end 40 of the clamp lever 38 carries in turn a pin 41 and a clamping shoe 42 rotatable about the pin 41.

The shoe 42 has a series of fine linear serrations 43 or circular serrations 44 or any pattern of surface roughness to aid gripping by frictional interaction between the shoe 42 and the anode rod 18, 18a.

As can be seen it is preferable if the lever means 38 is provided with a pivotable shoe 42, though the lever 38 may operate without one.

The anode rod clamp 17 of FIGS. 2 and 3 has a depending extention 45 usually in the form of an arm which angles downward so that when in normal mounted position it is usually vertical. At the lower end of the extension 45 is a fluid chamber 46 preferably adapted for pneumatic pressure. The chamber 46 has an outlet 47 which is preferably a quick connect and disconnect fixture for a fluid line preferably on an air line.

The clamp 17 is provided with a ram 48 having an end 49, cylindrical as shown, fitting into the chamber 46 so that it can be actuated by a pressure into the chamber 46 so that it can be actuated by a pressure input thru the outlet 47 and held extended when desired.

The trunnion 37 is provided with a pivot 50 at one end 35 of the trunnion 37. The pivot 50 is rotatably mounted in the opening 33 in the support bar 30. The other end 34 of the trunnion 37 may be provided with a flattened inset 51 which fits against a key 52, which as shown in FIGS. 2, 3, 7, 6, and 10 is preferably square in configuration and removably engaged in the square opening 34. Thus with the key 52 removed the trunnion 37 with all its clamping means may be rotated or pivoted open or away from its position athwart the support bars 30, 30a so that an anode rod 18, 18a may be engaged against the bus bar 13 between the support bars 30, 38, then relocked into engagement.

Figure 5:
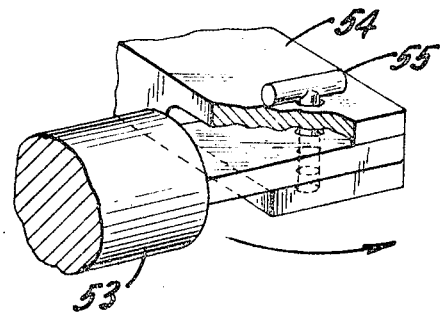
FIG. 5 is a detail of another embodiment of the trunnion and support of a clamp of the present invention.

In FIG. 5 a variant trunnion 53 is shown engaged in a bifurcated support bar 54, held in place by a T shaped key 55. Where a similar bifurcated locking arrangement (not shown) is provided for the other end of the trunnion 53 the trunnion 53 may be swung out in either direction depending upon which key is removed.

Figure 6:
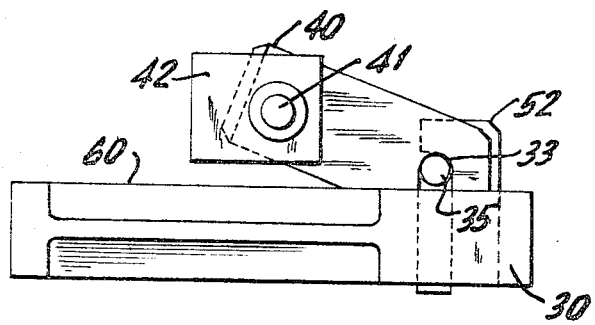
FIG. 6 is a side elevation of another embodiment of the present invention.
Figure 7:
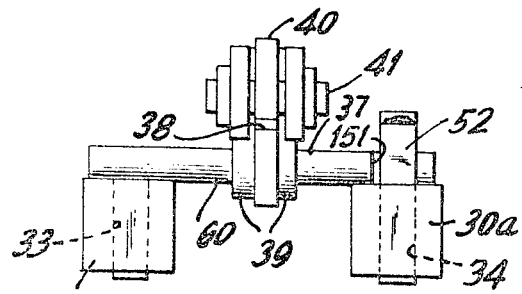
FIG. 7 is a front elevation of FIG. 6.

The clamp 60 as shown in FIGS. 6 and 7 functions in a manner similar to the clamp 17 only it is not provided with the extention 45, the chamber 46 and the ram 48.

In the operation of the clamp 17 it is desired to hold the anode rod 18, 18a as firmly as possible against the bus bar 13 with the greatest safety.

The clamp 60 herein requires no external force or torque to support the anode rods 18, 18a.

In operation the trunnion of the clamps 17, 60 and clamp lever 38 assembly is removed from the way, and the anode rod 18 is positioned between the support bars 30, 30a. As shown in FIGS. 2a and 2b this member may have optional configurations such as the T-shaped rod 18 or the rectangular rod 18a, or even be round or square and be of many conductive materials. With the anode rod 18, 18a in place, the trunnion 37 and clamp lever 38 assembly is set into place, the trunnion pivot 50 rotating in the support bar opening 33 and the trunnion key 52 replaced. The pivotable clamping shoe 42 is placed against the anode rod 18, 18a so that its serrations 43 bear against it. Thus anode rod 18, 18a is now clamped in place in frictional interaction with the assembly of the lever 38 and the weight of the anode 15 assembly activates the clamping action.

The operation of the clamping action of the clamps 17, 60 insofar as the pivotable shoe 42, or end of the lever 38, is concerned is based on the following kinematic condition:

$L_L$=length of clamp lever 38 between fulcrum on the trunnions and the shoe 42 or lever end at the anode rod 18, 18a.

$L_R$=Distance between support bar 30 on the bus bar 13, from the furthest point of extension of the anode rod 18, 18a from the bus bar 13 and fulcrum or trunnion 37.

It is evident that in order to supply the necessary force to keep the anode rod 18, 18a in place the dimension $L_L$ must be greater than $L_R$.

Looking at the forces in the anode rod 18, 18a it is clear that the only way to supply a reaction force to support the weight W of the anode rod 18, 18a and anode 15 assembly is to supply a frictional force $f$. This force can only arise from a normal force N and must be greater than UN where U is the coefficient of static friction.

The value of U varies depending upon materials and surface finish. For example, smoothly finished steel on aluminum has a value of .65. For a serrated member the value will be over 1.

The normal force N can only arise from the clamping shoe 42 which in turn transmits it to the clamp lever 38, when a shoe 42 is used. In order for the clamp lever 38 to supply this force it must be at a position $\theta$, 0°. At 0° it could supply no stable force and at 90° it would be unable to grasp. At values of $\theta$ slightly below 90 the member would tend to slide by, since the clamp lever 38 on the pivot point on the trunnion 37 does not have sufficient reach to grasp the anode rod 18, 18a, and interact.

The normal force supplied through the clamping shoe 42 multiplied by U must at least equal the weight of anode rod 18, 18a and anode 15 assembly to support it.

$$W = UN$$
$$N = F \cos \theta$$
$$W = UF \cos \theta$$

It is therefore apparent that the force F is greater for small values of $\theta$. (F=force in clamping lever 38).

As can be seen the clamping action of the clamps 17, 60 of the present invention may properly be adjusted to retain by their design the anode rod 18, 18a and anode 15 assembly so that the problems of the past clamping systems such as:

(1) No external force added to clamp, or tongue required to set clamp.
(2) Clamped member is not self-locking.
(3) Complexity of consrtuction are overcome.

The clamping shoe 42 pivoting on the pin 41 or even the lever 38 pivoting from its fulcrum permits the anode rod 18, 18a on the anode 15 assembly to be raised without danger of downward slippage into the pot 14 with its great likelihood of damage to the reduction system. The clamping shoe 42 pivoting upward on the pin 41 frees the anode rod 18, 18a from the grasp of the serrations 43. In any accidental slippage or release of this assembly the clamping forces are all rebrought into play to hold the anode 15 assembly.

Normally the clamping force N described previously is insufficient for the proper electrical operation of the anode 15 in a working reduction cell.

Conditions generally require a very high clamping force, greater than that available by the weight W alone so that current may be conducted from the bus bar 13 to the anode rod 18, 18a, most efficiently.

While the clamp 60 overcomes many of the problems of the prior art and as can be seen, an anode 15 and anode rod 18, 18a assembly may be raised while engaged in the clamp 60 and is protected against slippage downward. It is preferable that the clamping force be sufficient to reduce the electrical contact resistance to a minimum in order to prevent arcing, sparking and corrosion.

The power clamp 17 as shown in detail in FIGS. 2 and 3 has a power source to provide the extra holding power for best operations. The power source is interposed between the anode rod 18, 18a and the lever extension 45 where by expansion it provides a lever moment multiple of force bearing upon the lever 38 assembly and also upon the anode 18, 18a between the power source and the lever 45.

The power source as shown comprises the clamp extension lever 45 with the chamber 46 and ram 48. The illustration shows a system designed primarily for a pneumatic system though the power source may consist of a pneumatic or hydraulic cylinder, or bellows, telescoping tubes, a spring or screw mechanism, or a cam system adapted to apply a preferably controllable force to multiply the leverage between the trunnion 37 and the clamp extension 45 to firmly grasp the anode rod 18, 18a as shown in FIG. 2 when pneumatic pressure is put into the chamber 46 the end of the ram 48 and the shoe 42 both bear down heavily on the anodes rod 18, 18a.

A pneumatic system applied to the chamber 46 is preferred and easy to construct, maintain and is adaptable for gang operation of the clamp sets.

The parameters of the clamp 17 with a typical anode 15 assembly and power are for example:

(1) Total weight of anode 15 assembly—1,800 lbs.
(2) Diameter of actuating chamber 46 cylinder—4″
(3) Operating pressure of cylinder—100 p.s.i.
(4) Cylinder magnification factor—10:1
(5) Lever angle—15°

It is possible by suitably arranging the position of the actuating cylinder, the ram 48 in the chamber 46, and the clamping shoe 42 with respect to the distance from the trunnion 37, to obtain a force multiplying factor. Since the lever, the clamp extension 45 and cylinder assembly act as a simple beam pivoted about the trunnion 37, if the cylinder were four times as far from the pivot as the shoe 42, the shoe 42 would experience four times the cylinder force. It is, therefore, simple to obtain large clamping forces with a relatively small actuating cylinder. The cylinder may be replaced by a spring, screw or other force generating device.

The clamp 17 must supply at least a normal force whose frictional resultant is 1,800 lbs.

Therefore $\mu = 1,800$
minimum $\mu = 1,800/N$
$N = 12,500$
Cylinder force=
$.785 \; (4)^2 \times 100 = 12.5 \text{ in.}^2 \times 100 = 1,250$ lbs.
Normal force on rod = $1,250 \times 10 = 12,500$ lbs.

This is a low friction factor and very easy to obtain. A high value is preferable. Toward this end, it is advisable to serate or roughen the clamping end 43 of the shoe 42 so that a minimum factor of 1 is obtained. As long as the friction factor is greater than .144 (clean steel on steel), the clamp 17, 60 is operative. It should be noted that the anode 15 assembly weight assists in clamping at all times due to the wedging action of the clamping shoe 42 provided $$U >= .144$$

Summarizing the loads on the anode rod 18, 18a:

(1) Load at the shoe 42 on the anode rod 18, 18a=1,250 lbs.
(2) Load at the ram on the anode rod 18, 18a:
  (a) due to air pressure=12,500 lbs.
  (b) due to weight of anode assembly=

$$\frac{1,800}{\tan 15°} = \frac{1,800}{.267} = \frac{6,750 \text{ lbs.}}{19,250 \text{ lbs.}}$$

The load is compared with that obtained by a screw clamp. For a 1″ bolt the axial clamping force is $$N = \frac{T}{2D} \quad D = \text{diameter}$$

Where T=applied torque (about 300 in lbs. for a strong man)

$$N = \frac{300}{.2 \times 1} = 1,500 \text{ lbs.}$$

(significantly lower than 19,250 lbs.)

(3) Total clamping load on rod=

1,250
19,250
―――
20,500 lbs.

(4) Load per support bar=

$$\frac{20500}{2} = 10,250 \text{ lbs.}$$

(5) Shear stress on shoe pin 41=

$$\tau = \frac{19250}{1.23 \times 2} = 7,800 \text{ p.s.i.}$$

(6) Cylinder hoop stress=

$$\sigma = \frac{100 \times 4}{2 \times .25} = 800 \text{ p.s.i.}$$

(7) Trunnion shear stress=

$$\tau \frac{20,500}{2 \times 1.23} = 8,400 \text{ p.s.i.}$$

(8) Trunnion pin stress=

$$\sigma = \frac{20,500}{2(.1)} = 10,000 \text{ p.s.i.}$$

The various components of the clamp may be fabricated as weldments, castings, or machine parts. For the above test arrangement, castings were used.

Having the shoe 42 pivotable on the pin 41 aligns a maximum area of surface 43 against the anode 18, 18a since the shoe 42 tends to present a full surface along its entire face against the anode 18, 18a.

The upper clamp 100 as shown in FIGS. 1, 8, 9 and 10 does not need the stringent protective means provided for in the clamp 17, 60 although clamps such as shown in FIGS. 2, 3, 6 and 7 might serve for the purpose of the present invention.

The upper clamp 100 is mounted on the fixed superstructure bar 12 vertically above the clamps 17, 60 mounted on the bus bar 13.

The clamp 100 is provided with a support guide 102 and a clamp pivot block 103 spaced slightly apart from the normal vertical path of an anode rod 18, 18a, and a clamping bar 104 pivotable on a pin 105 which passes through an opening 106 through the clamp pivot block 103.

Figure 10:
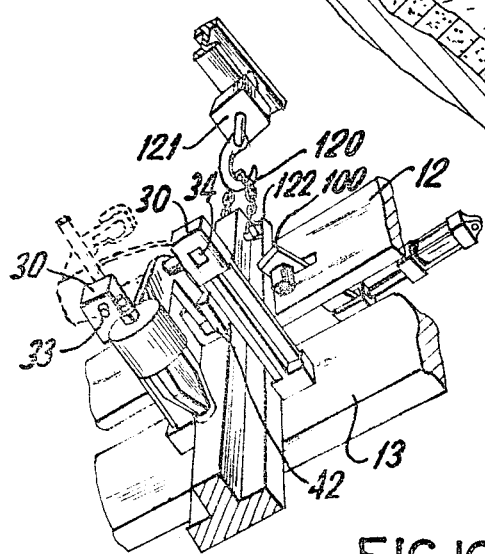
FIG. 10 is an isometric view of an anode with an upper and a lower anode clamp.
Figure 8:
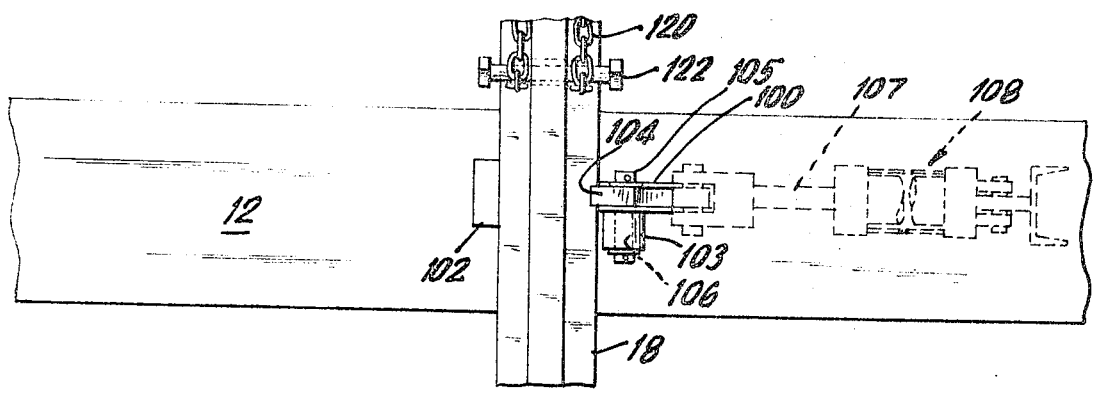
FIG. 8 is a front elevation of an upper clamp of the present invention on a stationary bar.
Figure 9:
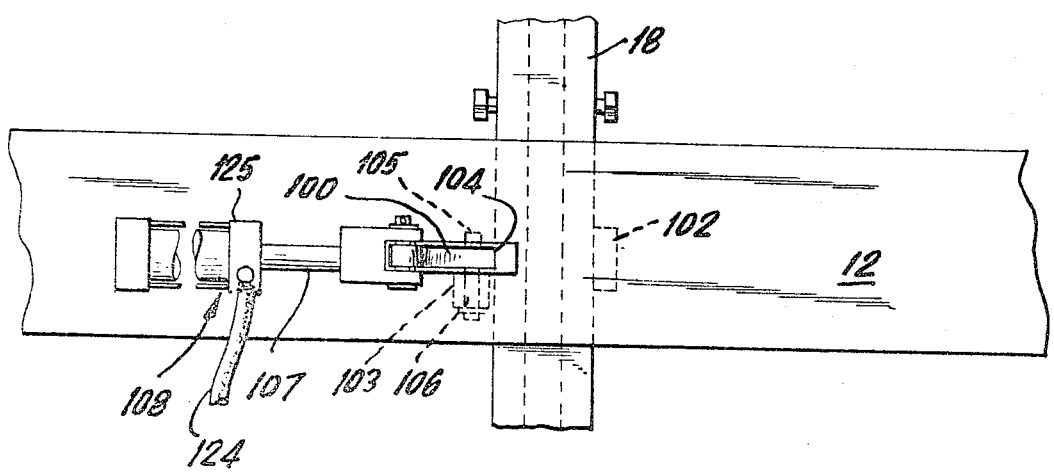
FIG. 9 is a rear elevation of an upper clamp of the present invention on a stationary bar.

The pin 105 holds the clamping bar 104 in place on the clamp pivot block 103. The other end of the clamping bar, 104 passes through the fixed bar 101 and is moveably attached to an arm 107 on a pneumatic or hydraulic cylinder 108. The cylinder 108 as shown in FIGS. 8, 9, and 10 is fixed to the bar 12.

When the arm 107 is retracted the clamp bar 104 rotates to engage the side of the anode rod 18, 18a holding the entire anode assembly by pushing the anode rod 18, 18a back against the fixed bar 12 and sideward against the support guide 102 providing a simple tight grasp.

The usual cells 1 in operation is provided with a plurality of anode 15 assemblies which must operate simultaneously together to obtain proper reduction and voltage. The anodes 15 in the course of their work usually burn out at the rate of about 1" a day, so that to maintain proper electrical contact it is necessary to lower the anodes 15 from time to time. Lowering is easily done since the bus bar 13 is movable both up or down. At some point however the travel of the bus bar 13 reaches its limit downward. At such time it is desirable to be able to adjust the anodes 15 without having to interrupt the functioning of the cell 10. This may be done by actuating the upper clamp 100 to grasp the anode rod 18, 18a then raising the bus bar 13 to get a new grasp. When the anode rod 18, 18a is grasped by the upper clamp 100 and the bus bar 13 is elevated. There is little disturbance to the continuing electrolytic process in the cell 10. When this is done it is necessary to release the pressure in the chamber 46 and to release the clamping shoe 42 and other clamping means mounted on the trunnion 37.

Once the bus bar 13 has been raised the key 52 is replaced, resetting the clamp 17, the pneumatic pressure reapplied and the upper clamp 100 is released allowing normal movement of the bus bar 13 with the anode 15 assembly firmly held.

When the reduced metal is removed from the pot 14 the level of the bath 16 is lowered requiring the anodes 15 to be lowered from proper contact. This lowering may be done by normal lowering of the bus bar 13.

When the anodes 15 are almost fully burned out it is desireable to replace them with the least interruption of operation of the cell. The anodes 15 may be replaced one at a time by having them grasped as shown in FIG. 10 by a chain 120 extending from a crane 121. The chain 120 grasps the anode rod 18, 18a from protrusions, 122 so that the anode 15 may be removed and a new anode 15 brought over to the cell 10 and placed in operative conditions.

This operation is similar to any adjustment of a single anode 15 when it is burned unevenly and should be raised or lowered to be even with the other anodes 15 to maintain constant current and avoid touching the cathode 20.

FIG. 2 illustrates a typical cross-section of a fluid injection zone in the tubular filtering device described in relation to FIG. 1. The outer conduit shown in FIG. 1 as 15 is illustrated as 70. The tubular element 70 may The clamp 17 for an adjustment must be released after the chain 120 is attached to the protrusions 122 then the crane 121 properly positions the anode 15 after which the clamp 17 is swung back into position, the trunnions 37 locked and pressure reintroduced into the chamber 46.

Since each operation or adjustment of the anodes 15 requires single or plural use of clamps 17, 60 and since there are usually several anodes in a bath 16 in the cell 10 it is preferable to have the pressure on the clamp 17 arranged for gang tightening with the rams 48 and yet have valves 123 for individual shut off or have also quick disconnect fittings 124 for the outlet 47.

In FIG. 11 is shown a schematic of the valve arrangement for control of the pressure to the lower clamps 17 when they are ganged and to the upper clamps 100 when they are ganged.

When it is necessary to raise the bus bar 13 to get a new grap on all the anode rods 18, 18a, the simpliest way to do this is to have all the air lines with quick disconnects 124 running to the outlets 125 on the upper clamps 100 actuated. All the valves 126 are opened so that actuating the master control valve 127 locks all anode rods 18, 18a as shown in FIG. 8.

Master control valve 128 for the lower clamp 17 pressure is then released. The anodes 15 are now held by the upper clamp 100. The keys 52 to the trunnions 37 are then removed and the clamping assemblies released or swung away and the bus bar 13 is raised to its upper level and the trunnions 37 all relocked. The master valve 128 may then be reactuated putting pressure into all the chamber 46 at once and the master valve 127 for the upper pneumatic or hydraulic system released freeing the anode rods 18, 18a from the fixed bar 12 that the anodes 15 and their assembly may again move freely with the bar bar 13.

Individual releases of all the disconnects 124 or closing all the valves 123 individually might effect the same result as using the master valve 128 for the lower clamps 17 through such system would of course require more labor.

The terms and expressions which are employed are used as terms of description; it is recognized, though that various modifications are possible within the scope of the invention claimed.

Having thus described certain forms of the invention in some detail, what is claimed is:

1. An electrode assembly comprising an electrode, an electrode rod supporting said electrode, an electrode clamp adapted to support said electrode rod in electric contact with an electric conductor comprising clamp mounting means, said clamp mounting means being in fixed relationship to said electric conductor, support means, said support means extending from said clamp mounting means, lever means, said lever means operably affixed to said support means, said lever means including a fulcrum at one of its ends, the end of said lever means spaced apart from said fulcrum adapted to frictionally interact with said electrode rod, said lever means spaced apart from said clamp mounting means and adapted to hold said electrode rod therebetween and in contact with said electric conductor, and said frictional interaction between said lever means and said electrode rod having a coefficient of friction as between themselves in an amount at least enough to support the weight of said entire electrode, the length of said lever means being greater than the distance from the furtherest extension of said electrode rod within said support means to the fulcrum of said lever.

2. The invention of claim 1 wherein the angle between said lever means and said electrode interacting is operably more than 0° and less than 90°.

3. The invention of claim 1 wherein said lever means includes a shoe adapted to interact with said electrode, said shoe being pivotably mounted on said lever means.

4. The invention of claim 3 wherein said lever means includes a friction means.

5. The invention of claim 1 wherein said conductor includes said clamp mounting means.

6. The invention of claim 1 wherein said lever means is adapted to be optionally pivoted from a locked operable position.

7. The invention of claim 1 wherein said support means are a pair of arms.

8. The invention of claim 7 wherein said arms are bifurcated at their ends.

9. The invention of claim 1 wherein said lever means include a trunnion operably affixed to said support means.

10. The invention of claim 9 wherein said trunnion is removably affixed to said support means.

11. The invention of claim 9 wherein one end of said trunnion is pivotably operable from said support means and another end is releasable operable from said support means.

12. The invention of claim 8 including a trunnion operably affixed to said arms.

13. The invention of claim 7 wherein said lever means include a trunnion, said trunnion including a depending portion adapted to pivot on one of said arms and means on the other of said arms adapted to releasably hold the other end of said trunnion.

14. The invention of claim 13 wherein said holding means is a key adapted to be held by said other arm.

15. The invention of claim 1 wherein said lever means includes a trunnion operably affixed to a pair of support arms, said lever means including a shoe adapted to interact with said electrode, said shoe being pivotally mounted on said lever means, said lever means adapted to be optionally released from operable position.

16. An electrode assembly comprising an electrode, an electrode rod supporting said electrode, an electrode clamp adapted to support said electrode rod in electric contact with an electric conductor comprising clamp mounting means, said clamp mounting means being in fixed relationship to said electric conductor, support means, said support means extending from said clamp mounting means, lever means, said lever means operably affixed to said support means, said lever means including a fulcrum at one of its ends, the end of said lever means spaced apart from said fulcrum including a shoe, said shoe pivotably mounted on said lever means and further adapted to frictionally interact with said electrode rod, said lever means spaced apart from said clamp mounting means and adapted to hold said electrode rod therebetween and in contact with said electric conductor, said frictional interaction between said lever means and said electrode rod having a coefficient of friction as between themselves in an amount at least enough to support the weight of said entire electrode rod, the length of said lever means being greater than the distance from the furtherest extension of said electrode rod within said support means to the fulcrum of said lever, and an arm depending from said lever means including expansible means interposable between said arm and said electrode rod adapted to optionally provide additional holding power to said clamp.

17. The invention of claim 16 wherein said expansible means are fluid operable.

18. The invention of claim 17 wherein said fluid is a gas.

19. The invention of claim 16 wherein said arm includes a chamber, a ram, said ram extending from said chamber and movably engaged in said chamber with a substantially fluid tight seal, said chamber including an opening through which a fluid may pass and move said ram.

20. The invention of claim 16 wherein said lever means including said arm are adapted to be optionally unlocked from said operable position.

21. The invention of claim 19 wherein said lever means includes a trunnion operably affixed to a pair of support arms, said lever means adapted to be optionally released from operable position.

22. An electrode assembly comprising an electrode, an electrode rod supporting said electrode and an electrode clamping system said system comprising a first electrode clamp, said first electrode clamp adapted to support an electrode rod in electric contact with an electric conductor said first electrode clamp comprising mounting means, said first electrode clamp mounting means being in fixed relationship to said electric conductor, said first electrode clamp mounting means and said electrical conductor being vertically adjustable, support means, said support means extending from said first electrode clamp mounting means, lever means, said lever means operably affixed to said support means, said lever means including a fulcrum at one of its ends, the end of said lever means spaced apart from said fulcrum adapted to frictionally interact with said electrode rod, said lever means spaced apart from said first electrode clamp mounting means and adapted to hold said electrod rod therebetween and in contact with said electric conductor, said frictional interaction between said lever means and said electrode rod having a coefficient of friction as between themselves in an amount at least enough to support the weight of said entire electrode, the length of said lever means being greater than the distance from the furthest extension of said electrode rod within said support means to the fulcrum of said lever, and a second clamp vertically spaced away from said first electrode clamp.

23. The invention of claim 22 wherein said first electrode clamp includes a shoe pivotally mounted on said lever means, an arm depending from said lever means including expansible means interposible between said arm and said electrode rod adapted to optionally provide aditional holding power to said clamp.

24. The invention of claim 23 wherein said second clamp includes support means rigidly fixed in position.

25. The invention of claim 23 wherein said second clamp comprises the construction of said first clamp.

26. The invention of claim 24 wherein said expansible means of said first electrode clamps are fluid operable.

27. The invention of claim 26 wherein said fluid is a gas.

28. The invention of claim 24 wherein said arm includes a chamber, a ram, said ram extending from said chamber and movably engaged in said chamber with a substantially fluid tight seal, said chamber including an opening through which a fluid may pass and move said ram.

29. The invention of claim 24 wherein said lever means including said arm are adapted to be optionally released from operable position.

30. The invention of claim 29 wherein said second clamp comprises a stop means on said fixed support means, said stop means close to a normal vertical position of said electrode, and said second clamp further including a pivot arm adjacent to said stop means, said pivot arm adapted to engage said electrode against said stop means and said clamp support means when activated and support the entire weight of said electrode.

31. The invention of claim 30 wherein said pivot arm is linked to fluid actuation means.

32. The invention of claim 31 including a plurality of first electrode clamps and a plurality of second clamps, control means for said first electrode clamp, said control means being adapted to selectively actuate said first electrode clamp expansible means, control means for said second clamp, said control means being adapted to selectively acutuate said second clamp.

References Cited

UNITED STATES PATENTS

| | | | |
|---|---|---|---|
| 3,434,955 | 3/1969 | Duclaux | 204—225 |
| 3,503,892 | 3/1970 | Barabas et al. | 204—225 |

WINSTON A. DOUGLAS, Primary Examiner

H. A. FEELEY, Assistant Examiner